United States Patent
Ayers et al.

[11] Patent Number: 5,836,341
[45] Date of Patent: Nov. 17, 1998

[54] FUEL TANK VAPOR CONTROL APPARATUS

[75] Inventors: Douglas William Ayers, Milan; Mark Nulman, West Bloomfield; George Francis Stringfellow, Dearborn Heights, all of Mich.

[73] Assignee: Ford Motor Company, Dearborn, Mich.

[21] Appl. No.: 829,664

[22] Filed: Mar. 31, 1997

[51] Int. Cl.[6] .................................................. F16K 24/04
[52] U.S. Cl. ......................... 137/202; 55/385.3; 137/43
[58] Field of Search ................... 137/43, 202; 55/385.3, 55/385.4, DIG. 13

[56] References Cited

U.S. PATENT DOCUMENTS

| | | |
|---|---|---|
| 3,782,406 | 1/1974 | Siebold . |
| 4,033,475 | 7/1977 | Evans . |
| 4,352,364 | 10/1982 | Orsino et al. . |
| 4,655,189 | 4/1987 | Koga . |
| 4,655,238 | 4/1987 | Szlaga ........................................ 137/43 |
| 4,666,058 | 5/1987 | Harris ........................................ 137/43 |
| 4,679,581 | 7/1987 | Mears ........................................ 137/43 |
| 5,031,655 | 7/1991 | Hebaus . |
| 5,234,013 | 8/1993 | Roetker et al. . |
| 5,388,301 | 2/1995 | Bosyj et al. ........................... 15/353 X |
| 5,568,823 | 10/1996 | Tateishi .................................... 137/202 |
| 5,570,489 | 11/1996 | Lee ............................................ 15/353 |
| 5,687,753 | 11/1997 | Doll ........................................... 137/43 |

OTHER PUBLICATIONS

ATL Saver Cell Racing Fuel Cell Brochure, 2 pages, Dec. 1993.
ATL Racing Fuel Cells Catalog, pp. 4–23, Dec. 1993.

*Primary Examiner*—Gerald A. Michalsky
*Attorney, Agent, or Firm*—Gregory P. Brown

[57] ABSTRACT

A fuel tank vapor control apparatus controls the flow of liquid and vapor fuel through an aperture in a fuel tank (16). The fuel tank vapor control apparatus includes a vent housing (12) mounted in the aperture (34) and formed to include a vent inlet (13) and a vent outlet (36), the vent housing (12) defining a vent path for communicating vapor fuel from the fuel tank between the vent inlet and the vent outlet. The apparatus also includes a valve (48) movable in the vent housing between a blocking position for blocking flow of liquid and vapor fuel from the fuel tank between the vent inlet and the vent outlet along the vent path and a venting position allowing flow of vapor fuel between the fuel tank and the vent outlet along the vent path. A labyrinthine member (140) is also included, being disposed between the fuel tank and the vent path for discriminating fuel vapor from liquid fuel so as to block liquid fuel from the vent path.

4 Claims, 3 Drawing Sheets

FUEL TANK VAPOR CONTROL APPARATUS

BACKGROUND OF THE INVENTION

1. Field of the Invention

This invention relates generally to fuel tank venting devices for controlling the flow of fuel vapors in a motor vehicle fuel delivery system. More particularly, the present invention relates to a fuel tank vapor control system that resists inadvertent vent valve closures due to fuel slosh.

2. Disclosure Information

It is well known to provide controlled venting of fuel vapors within a fuel tank of a motor vehicle to maintain internal tank pressures at a predetermined level. Fuel vapors may be created in the fuel tank as a result of temperature differences in the vapor space and the fuel itself, as well as by sloshing and agitation of the fuel during normal operation of the vehicle. The pressure generated from the resultant vapor generation is relieved by venting the pressure to atmosphere. Traditional vapor vents include design provisions to prevent the passage of liquid fuel.

In the traditional fuel system, provisions were made for recovering the fuel from the vapors and returning the liquid fuel to the fuel tank. It has been discovered that the vapors can be routed to the intake manifold of the internal combustion engine for direct consumption by the engine. This has presented a challenge in that previously, if fuel slosh caused the vapor vent valve to close, the discontinuous flow of fuel vapor had no consequences, now it can result in irregular fuel delivery to the engine, which in some instances may cause a rough running engine condition.

It would therefore be desirable to provide a fuel tank vapor control system less sensitive to liquid fuel contacting the vapor vent valve, such that inadvertent interruptions of vapor deliver to the engine may be minimized.

SUMMARY OF THE INVENTION

According to the present invention, a fuel tank vapor control apparatus for controlling the flow of liquid and vapor fuel through an aperture in a fuel tank has been discovered for isolating a fuel valve from transient liquid fuel contact, thereby reducing interruptions of fuel vapor delivery to an internal combustion engine. The fuel tank vapor control apparatus includes a vent housing mounted in the aperture and formed to include a vent inlet and a vent outlet and defining a vent path for communicating vapor fuel from the fuel tank between the vent inlet and the vent outlet.

A valve is movably located in the vent housing between a blocking position for blocking flow of liquid and vapor fuel from the fuel tank between the vent inlet and the vent outlet along the vent path and a venting position for allowing flow of vapor fuel between the fuel tank and the vent outlet along the vent path. The apparatus also includes a labyrinthine member disposed between the fuel tank and the vent path allowing vapor fuel to flow in the vent path and blocking liquid fuel flow in the vent path.

Advantageously, the surface tension of the liquid fuel closes the open cells in the foam, creating a restriction to the passage of liquid fuel, preventing intermittent interruptions of vapor flow through this vapor vent valve.

DETAILED DESCRIPTION OF THE PREFERRED EMBODIMENT

Figure 1:
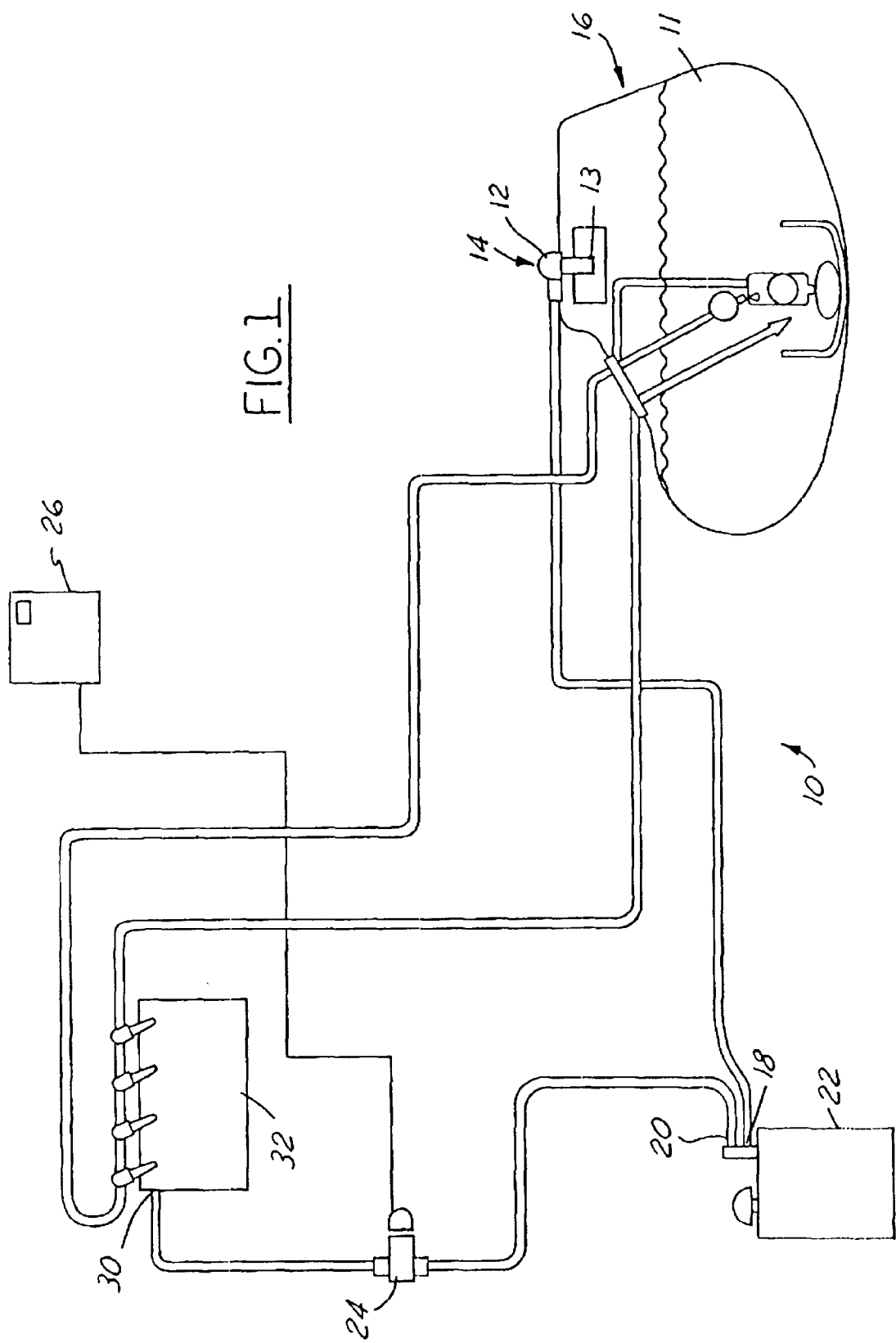
FIG. 1 is schematic view of a fuel tank vapor control apparatus constructed in accordance with the present invention.
Figure 2:
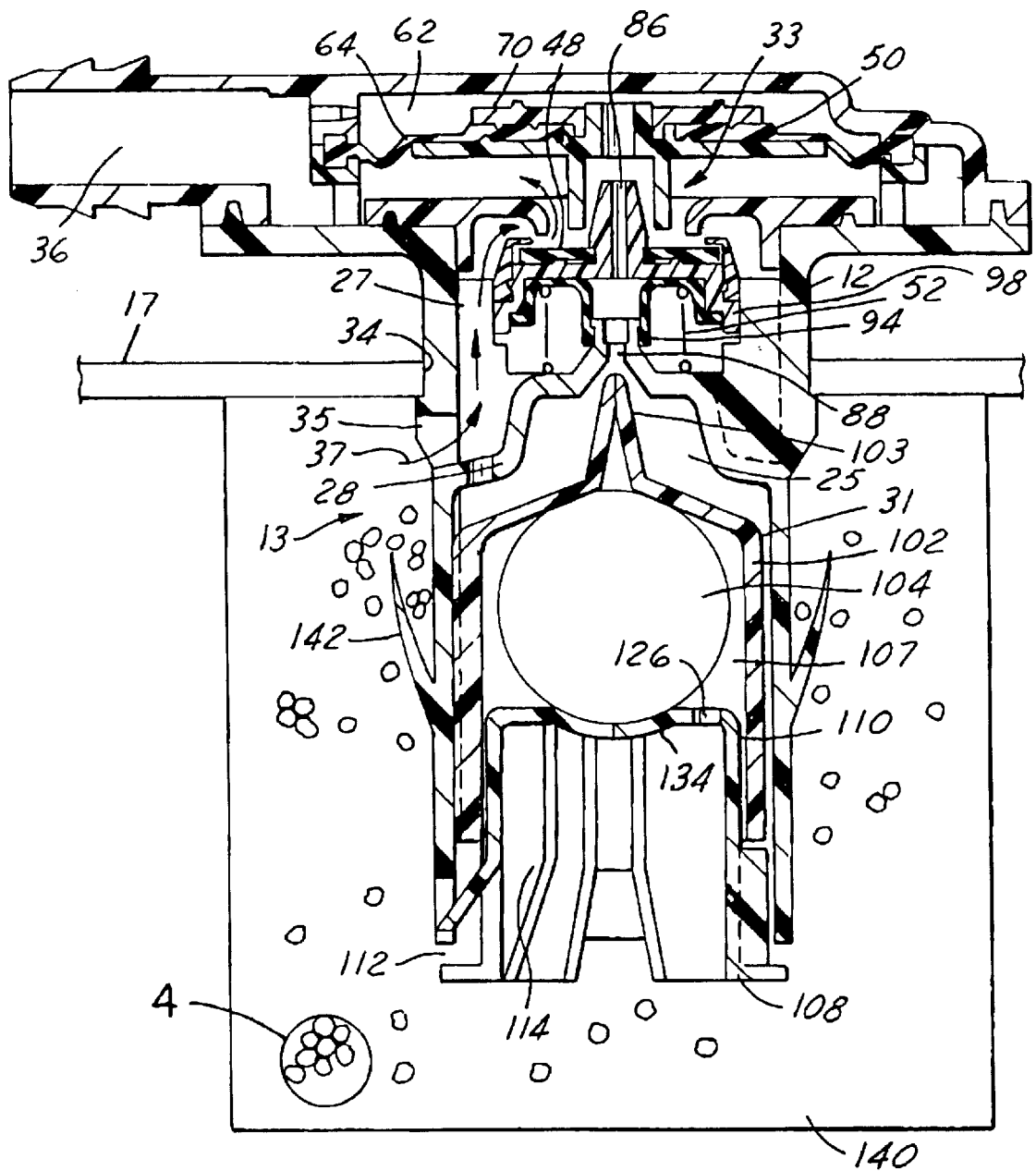
FIG. 2 is a cross-sectional view taken from FIG. 1 of a fuel tank vapor control apparatus in a open state according to the present invention.

Referring now to FIGS. 1 and 2, a fuel tank vapor control apparatus includes a vent housing 12 having a vent inlet 13 disposed in a fuel tank 16 and in fluid communication with a fuel vapor treatment device 22, such as a charcoal filled vapor recovery canister. The canister 22 receives the vapors from the vent housing 12 through a canister inlet 18 and communicates those vapors through a canister outlet 20 to a vapor purge valve 24, which receives control signals from an engine controller 26. The vapor purge valve 24 is also in fluid communication with an intake manifold 30 of an internal combustion engine 32. The engine controller 26 also generates control signals for the primary fuel delivery system, which in part depends on the control signal generated for the vapor purge valve 24.

As shown in FIG. 2, vent housing apparatus 12 is designed to be mounted in an aperture 34 formed in a top wall 17 of the fuel tank. Housing 12 is formed to include a hollow interior which is divided into a lower chamber 25 and an upper chamber 27 by a flow shield 28. Lower chamber 25 houses a rollover valve assembly 31, while upper chamber 26 houses valve assembly 33.

Housing 12 is formed to include a valve inlet 35 which allows fuel vapor from the fuel tank to pass into upper chamber 27. Valve inlet 35 is sized to permit relatively large volumes of fuel vapor to pass into upper chamber 27 for eventual venting past the valve 33 to canister 22 as will be subsequently described. Depending on the size of the fuel tank, it may be desirable to include a plurality of valve inlets to provide adequate vapor flow. Housing 12 is also formed to include a vent outlet 36 which allows passage of fuel vapor from housing 12 to the canister inlet 18. Housing 12 thus defines a vent path for fuel vapors 37 to flow between the fuel tank 16 and outlet 36.

The flow of fuel vapor along the vent path is controlled by valve assembly 33. Valve assembly 33 includes a valve 48 and a valve actuator 50. Valve 48 is typically of the variety of valves known as "poppet" valves.

Figure 3:
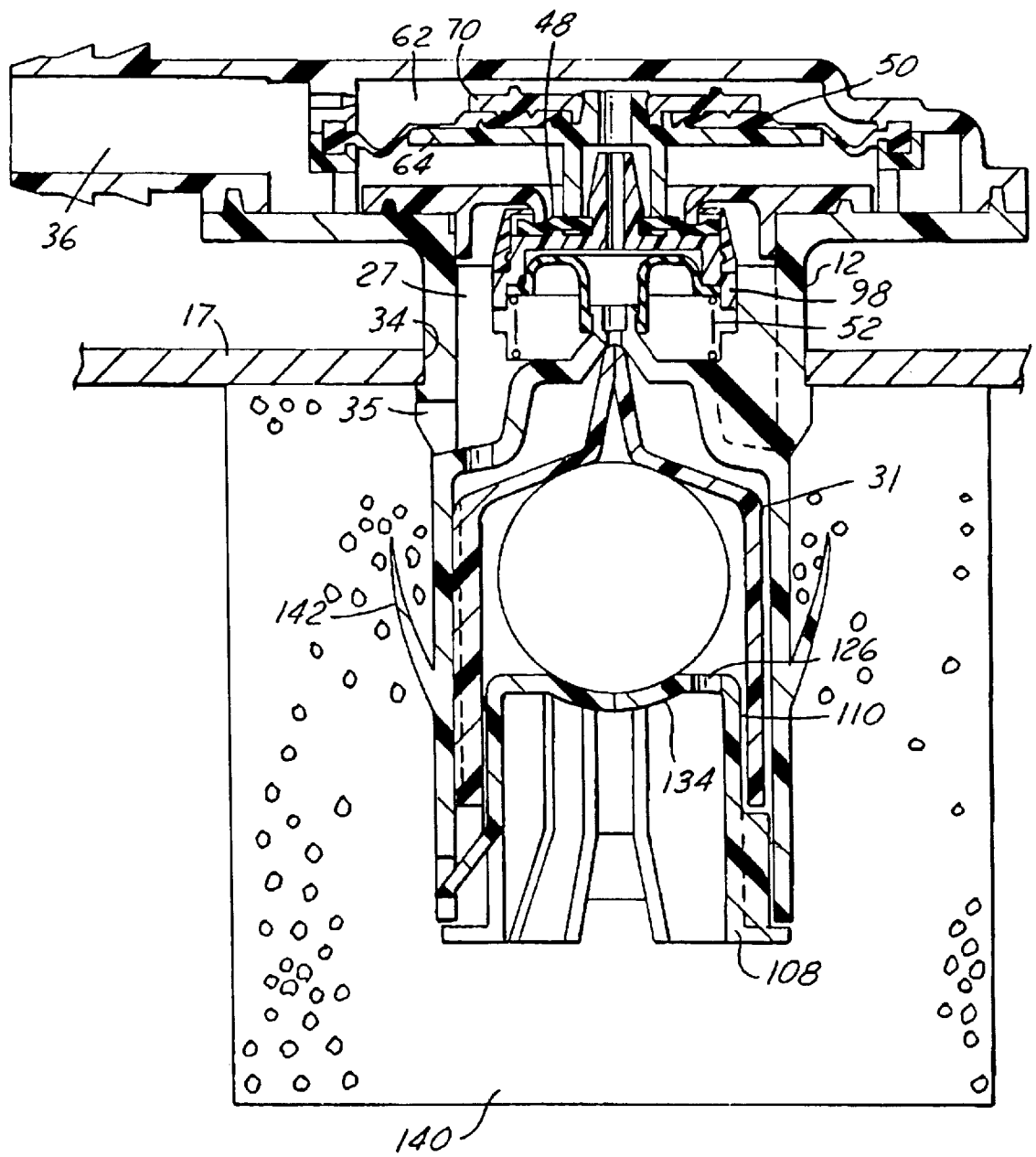
FIG. 3 is a cross-sectional view taken from FIG. 1 of a fuel tank vapor control apparatus in a closed state according to the present invention.

Referring now to FIGS. 2 and 3, valve 48 is moveable between a blocking position (shown in FIG. 3) and a venting position (shown in FIG. 2). Valve assembly 33 also includes a spring 52 acting between flow shield 28 and valve 48 to bias valve 48 towards its blocking position. Valve 48, when thus seated, blocks flow of fuel vapor between the fuel tank and outlet 36 along the vent path. When moved away from its blocking position to its venting position, valve 48 allows flow of fuel vapor between the fuel tank and outlet 36 along the vent path.

Valve actuator 50 is provided to move valve 48 from its blocking position against spring 52 to its venting position when the fuel vapor pressure in the fuel tank exceeds a predetermined level. Fuel vapor from the fuel tank is used to depress valve actuator 50, which in turn urges valve 48 toward its venting position shown in FIG. 2.

Diaphragm 64 is movable in response to an accumulation of fuel vapor pressure in venting control chamber 62 between a static position allowing valve 48 to remain in its blocking position and an actuating position urging valve 48 against the bias of spring 52 toward its venting position.

The fuel tank vapor control system is also provided with rollover valve assembly 31 as previously noted. Although any of a number of designs may be used, a preferred rollover valve assembly includes a float valve 102 or other liquid discriminator provided with a captured stainless steel ball 104 for inertial actuation of the float valve. Float valve 102 includes a nipple 103 to seat in sealing engagement with a surface 105 to block the flow of fuel vapor and liquid fuel from lower chamber 25 through inlet opening 88.

In particular, rollover valve assembly 31 includes, in addition to float valve 102 and captured ball 104, a retainer 108 and a support assembly 110. Float valve 102 cooperates with support assembly 110 to define a float chamber 107 in which ball 104 is positioned. Retainer 108 is designed to snap fit into openings 112 formed in housing 12. Retainer 108 also includes a plurality of vertically extending fins 114 positioned in approximately equally spaced intervals about the circumference of retainer 108. Support assembly 110 further includes a curved upper surface 134 providing a seat for ball 104 to insure proper camming relationship between ball 104 and support assembly 110. The curvature of curved upper surface 134 may be varied according to design considerations. For example, the curvature might be varied so that float valve 102 remains in its open position as the vehicle is subjected to a grade of less than or equal some predetermined amount. A plurality of openings 126 may be formed on support assembly 110 in approximately equally spaced intervals about curved upper surface 134, allowing passage of a limited amount of fuel vapor therethrough.

Figure 4:
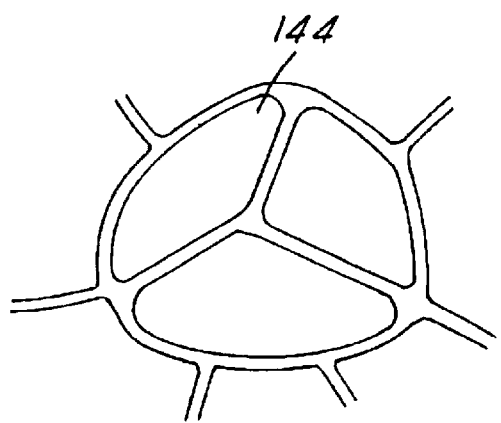
FIG. 4 is a view of a foam member having open cell structure for use in a fuel tank vapor control apparatus in accordance with the present invention.

A labyrinthine member, such as a block of foam 140 having open cell structure 144, as can best be seen in FIG. 4, of sufficient size to envelope the desired valve inlets is attached to the valve housing 12 with outwardly projecting barbs 142. Alternatively, the foam could be attached using an adhesive or a strap. The foam may be constructed from urethane, such as polyether-polyeurethane or polyester-polyeurethane, or any other material having similar properties capable of fulfilling the intended purpose as disclosed herein. Preferably, the open cell foam is preferably greater than 90% open.

Operation of the illustrated embodiment of the invention with valve 48 in its blocking position is shown in FIG. 3. Valve 48 occupies its blocking position as shown when fuel vapor pressure in the fuel tank is relatively low. Float valve 102 may occupy the position as shown, blocking flow of liquid fuel and fuel vapor through inlet opening 88 if the liquid fuel level in the fuel tank is relatively high. Otherwise, float valve 102 will be moved to a position away from inlet opening 88 allowing passage of fuel vapor therethrough.

At relatively low tank pressures with float valve 102 moved away from inlet opening 88, a small volume of fuel vapor can pass through the inlet 88 to reach venting control chamber 62 to serve as a pressure signal for diaphragm 64.

However, at low tank pressures, the fuel vapor accumulating in venting control chamber 62 does not supply sufficient force to diaphragm 64 to move diaphragm 64 away from its static position as shown in FIG. 3. Valve 48 thus remains in its blocking position preventing flow of fuel vapor through upper chamber 27 along vent path 37.

As shown in FIG. 2, at higher tank pressures, the fuel vapor pressure signal in venting control chamber 62 applies sufficient force to diaphragm 64 to move diaphragm 64 to its actuating position, in turn moving valve 48 from its blocking position to its venting position.

Once valve 48 has been urged into the venting position, fuel vapor can flow along vent path 37 through housing 12 to outlet 36, and then to vapor canister 22 and from there on to the engine 32 if the engine controller 26 so demands. Valve 48 will remain in this venting position until the fuel vapor pressure in the fuel tank is reduced to a predetermined level.

As the fuel vapor pressure in the fuel tank is reduced through venting, the pressure in venting control chamber 62 is of course also reduced. The force applied by fuel vapor in venting control chamber 62 diminishes to the point at which it becomes insufficient to maintain diaphragm 64 in the actuating position. Diaphragm 64 thus begins to return to its static position shown in FIG. 3.

Rollover valve assembly 31 is designed to quickly move to a closed position preventing flow of fuel vapor and liquid fuel through inlet opening 88 when exposed to sloshing or vertical surges of liquid fuel. The term "sloshing" as used herein refers to the tendency of liquid fuel to form waves moving essentially horizontally in response to vehicle movement. The foam block significantly reduces the occurrence of liquid fuel contacting the rollover valve assembly 31 or the valve inlet 35. Vapor can easily flow through the foam material with an insignificant pressure drop, due to the open cell structure. However, liquid does not readily pass through the foam material, as the surface tension of the liquid blocks the small cellular openings in the foam. This liquid then seeps back into the tank after a short period of time, allowing fuel vapors to pass through the foam with insignificant restriction. Thus, the open cell foam is capable of restricting the flow of liquid fuel, while allowing relatively unrestricted fuel vapor flow.

The foregoing description presents a the preferred embodiment of the present invention. Details of construction have been shown and described for purposes of illustration rather than limitation. For instance, the housing 12 may only include a single valve, operative as a rollover valve, rather than the advance dual valve design illustrated herein. Other modifications and alterations of the invention will no doubt occur to those skilled in the art that will come within the scope and spirit of the following claims.

What is claimed:

1. A fuel tank vapor control apparatus for controlling the flow of liquid and vapor through an aperture in a fuel tank, the fuel tank vapor control apparatus comprising:

a vent housing mounted in the aperture and formed to include a vent inlet and a vent outlet, the vent housing defining a vent path for communicating vapor from the fuel tank between said vent inlet and said vent outlet;

a valve movable in said vent housing between a blocking position blocking flow of liquid and vapor from the fuel tank between said vent inlet and said vent outlet along said vent path and a venting position allowing flow of vapor between the fuel tank and said vent outlet along said vent path; and a greater than 90% open cell foam member having a volume substantially less than the volume of the fuel tank and being attached to said vent inlet between the fuel tank and said vent path, said foam member allowing vapor to flow in said vent path and blocking liquid flow in said vent path.

2. A fuel tank vapor control apparatus according to claim 1, wherein said foam member envelopes said vent inlet of said vent housing.

3. A fuel tank vapor control apparatus according to claim 2, wherein said vent housing further comprises a barb for attaching said foam member to said vent inlet of said vent housing.

4. A fuel tank vapor control apparatus for controlling the flow of liquid and vapor fuel through an aperture in a fuel tank for use in a motor vehicle having an internal combustion engine, the fuel tank vapor control apparatus comprising:

- a vent housing mounted in the aperture and formed to include a vent inlet and a vent outlet, the vent housing defining a vent path for communicating vapor from the fuel tank between said vent inlet and said vent outlet;
- a vapor canister having a canister inlet in communication with said vent outlet and a canister outlet in communication with an intake manifold on the internal combustion engine;
- a greater than 90% open cell foam member enveloping said vent inlet of said vent housing having a volume substantially less than a volume of the fuel tank and being disposed between the fuel tank and said vent path allowing vapor to flow in said vent path and blocking liquid flow in said vent path; and
- a barb for attaching said foam member to said vent inlet of said housing.

* * * * *